United States Patent [19]

Baker

[11] 3,812,520

[45] May 21, 1974

[54] PARASITIC TRANSISTOR SHIFT REGISTER

[75] Inventor: Lamar T. Baker, West Islip, Long Island, N.Y.

[73] Assignee: General Instrument Corporation, Newark, N.J.

[22] Filed: Aug. 24, 1972

[21] Appl. No.: 283,536

[52] U.S. Cl. ............. 317/235 R, 307/205, 307/238, 307/251, 307/221 C, 307/279, 307/304, 317/235 G

[51] Int. Cl. ............................................ H01l 19/00

[58] Field of Search ........ 317/235 B, 235 G, 235 R; 307/221 C, 251, 279, 213, 205, 304, 238

[56] References Cited

UNITED STATES PATENTS

| | | | |
|---|---|---|---|
| 3,622,812 | 11/1971 | Crawford | 307/303 |
| 3,638,039 | 1/1972 | Chen et al. | 307/238 |
| 3,639,787 | 1/1972 | Lee | 307/303 |
| 3,644,905 | 2/1972 | Baker | 340/173 FF |
| 3,656,119 | 4/1972 | Baker | 340/173 FF |
| 3,702,945 | 11/1972 | Faith et al. | 307/251 |
| 3,736,521 | 5/1973 | Baker | 330/35 |
| 3,401,319 | 9/1968 | Watkins | 317/235 |
| 3,414,737 | 12/1968 | Bowers | 307/243 |
| 3,454,785 | 7/1969 | Norman et al. | 307/221 |
| 3,465,293 | 9/1969 | Weckler | 340/166 |
| 3,553,541 | 1/1971 | King | 317/235 |
| 3,573,509 | 4/1971 | Crawford | 307/303 |
| 3,676,711 | 7/1972 | Ahrons | 307/293 |

FOREIGN PATENTS OR APPLICATIONS

| | | |
|---|---|---|
| 1,238,360 | 7/1971 | Great Britain |
| 1,172,387 | 11/1969 | Great Britain |

OTHER PUBLICATIONS

R. Gladu, "Use of Lateral NPN Devices For Interfacing FET Circuits," IBM Tech. Discl. Bull., Vol. 13, No. 2, July 1970, p. 315.

A. Zehle, "Three-Device FET Cell," IBM Tech. Discl. Bull., Vol. 14, No. 1, June 1971, p. 273.

*Primary Examiner*—Rudolph V. Rolinec
*Assistant Examiner*—Joseph E. Clawson, Jr.

[57] ABSTRACT

An improved high speed dynamic MOS shift register is designed to operate under the control of a two-phase clock cycle and utilizes only four MOS devices per bit of the register. This is accomplished by using the normally undesirable parasitic transistor inherently formed laterally between the adjacent P regions of two active MOS devices. The thus formed effective transistor is utilized to provide an operative conditional discharge path through the grounded substrate thereby to eliminate the need for additional isolation devices and load resistor ratio circuits. Accordingly, all MOS devices may be formed of a uniform minimum size effective to provide high speed low power switching. Moreover, since parasitic transistor action is actively utilized in the operation of the circuit, the active MOS devices may be formed with their P regions in closely adjacent relationship thereby to increase the density of the circuit on the semi conductor chip.

14 Claims, 3 Drawing Figures

PARASITIC TRANSISTOR SHIFT REGISTER

The present invention relates to logic circuits and more particularly to an improved MOS two-phase shift register.

Logic circuits of the type described are basic building blocks of digital data processing systems. In circuits of this type, the data is stored at one or more nodes at either of two discrete signal levels corresponding to either a logic "0" condition or a logic "1" condition (arbitrarily termed "false" and "true" conditions, respectively). The circuit is adapted to perform sequential logical operations upon incoming data and provide output data in accordance with such operations. Such circuits may be used as shift registers, counters, adders, and with various gates for performing specific logical operations.

In recent years, a new technology has been developed in the semiconductor art in which a plurality of switching devices are fabricated to form an integrated circuit on a chip of semiconductor material. In the fabrication of these circuit chips, and particularly where utilized in logic circuits, insulated gate or metal oxide silicon (MOS) field-effect transistors (FETs) have been found to be particularly effective as high-speed switching devices. These transistors are formed on a chip of semiconductor material by performing appropriate operations on suitably doped regions of the semiconductor substrate to produce the basic elements forming an individual FET. These elements include a control terminal generally termed the gate, and a pair of output terminals generally termed the source and drain respectively. In one type of FET if the signal at the gate is negative with respect to its output terminals, the output circuit between the source and the drain is closed, that is, the device is in the "on" state. If the signal at the gate is positive with respect to its output terminals, the output circuit is characterized by an extremely high impedance equivalent to an open circuit, that is, the device is in the "off" state. Another type of FET functions in just the opposite fashion. Thus, the FET operates as a high-speed switching device controlled by the signal level applied to its gate terminal. For purposes of explanation throughout this specification the MOS FETs therein are described and illustrated as comprising the first type, that is, a logic "0" or more positive signal level refers to a level insufficient to turn a device "on" when applied to its gate terminal and a logic "1" or more negative signal level refers to a level which is sufficient to turn a device "on" when applied to its gate terminal.

Moreover, the terms "positive" and "negative" when used in reference to a signal or charge are relative and refer to the more positive or negative of the two operative signal levels as the case may be. No external bias signals are required to operate the FET as a switching device. These devices are well suited for the mechanization of complex logic functions on a single substrate of semiconductor material by virtue of their extremely small size, low power requirement and ease of fabrication in large quantities.

A serious problem which may arise in logic circuits using MOS devices of the type described is what is known as parasitic transistor action. Thus, regions in closely adjacent (but ideally functionally distinct) MOS devices of like conductivity tend to form an effective bipolar transistor with the opposite conductivity type substrate material therebetween. This tends to produce an undesired flow of carriers from one FET region to another, thereby to distort or change the logic signal level at that region. For example, where a pair of P type enhancement mode MOSFETs are integrated in closely adjacent relationship, an effective PNP transistor is formed therebetween. This parasitic transistor action severely limits the permissible circuit density of MOS integrated circuits and in some cases may require the addition of a "blocking" diffused region.

In the operation of a typical synchronous logic circuit of the type described, the various logic operations are performed under the control of timed clock signals. The standard MOS logic circuit is adapted to be controlled by two-phase logic comprising two alternative sequential clock pulses defining two clock intervals, respectively. A complete cycle of operation comprises two such intervals. During one interval a node capacitance is operatively connected to a negative reference voltage source and thereby is conditionally charged or discharged depending upon the presence or absence of a conductive discharge path across said voltage source. The availability of such a discharge path in turn depends upon the logic level of the data input signal impressed on the gate terminal of a FET disposed in such discharge path. Advantage is taken of the low "on" resistance of insulated gate field-effect transistors to provide the conductive charging and discharging paths. The infinite "off" resistance of FET devices allows the charge to be stored on a capacitor, or as is usually the case, on the inherent effective capacitance of the FET devices themselves, during the interval between clock phases, thereby maintaining the logic level prior to the next logic operation. The charge-discharge time determines the high frequency limit while the charge leakage determines the low frequency limit. Once the capacitor has been fully charged current flow ceases and quiescent power dissipation is zero.

By means of the above process, for example in a shift register, the complement of the data input signal is deposited and stored at an operative node capacitance during the first clock interval. A second stage controlled by the second clock pulse is adapted to again invert the signal thus stored and deposit the reconstitution of said input signal at the next operative data node, and so on until the data reaches the output of the register.

In existing MOSFET logic circuits, circuit nodes are typically adapted to be charged negative by means of a clocked load device, comprising a MOSFET having a relatively high "on" resistance interposed between the reference voltage source and the nodes to be charged. The discharge path comprises a switching FET controlled by the operative data signal in series with such load device. In order to generate distinct logic "0" and "1" levels the "on" resistance of the load FET must be considerably higher than that of the switching FET. This necessitates a physically large load FET having a large gate electrode surface area and therefore a relatively large gate to drain capacitance. In typical circuits of the type described the clock capacitances are comprised primarily of the gate capacitance of the clocked load FETs. Accordingly, the power dissipated in generating the clock signals used to drive such large load FETs is a significant factor in system design. Thus, for example, in a large two-phase dynamic shift register (i.e., 200 bits long) the clock capacitance is typically about 60 pf. Moreover, there is a significant power dissipation in the register itself as a result of the D.C. current which flows through the above mentioned series connection from the voltage supply to ground during data discharge.

A relatively recent advance in MOS logic circuit design which significantly reduces power requirements both in the circuit itself and in the clock generator is four-phase logic which effectively eliminates D.C. current from the negative voltage supply to ground. This is accomplished by the use of clocked switching devices for both charging and discharging the operative circuit nodes, those devices serving to isolate the operative data node between switching operations. As a result, the only power required is the transient needed to charge and/or discharge the storage capacitors. Since these capacitors are relatively small, power dissipation is low. An added advantage of four-phase circuits is the higher frequency capability which results from the isolation of the operative data storage capacitor from the voltage supply during discharge. Thus, when the input data is negative, the output node may be discharged without having to buck D.C. charging current through a load device as is the case in conventional two-phase circuitry.

Finally, since in most four-phase circuits all active devices can be the same small size (by contrast to the need for large load devices in conventional two-phase logic), circuit density is higher and more complicated circuits can be designed in smaller chip area.

The advantages of four-phase circuitry, however, are not achieved without cost. Thus, it will be apparent that four-phase logic requires the generation of an additional pair of clocks and if total speed of operation is to be maintained, those clocks must be of extremely high frequency and small pulse width. For example, in a four-phase shift register, a full cycle of operation required to shift the data through one bit of the register requires four clock pulses (as opposed to two in conventional shift registers). Moreover, while all devices are small, more are required for each bit of the register so that cost and total chip space are considerably increased. Finally, in typical four-phase logic circuits, the additional isolation device substantially doubles the resistance of the discharge path to ground, thereby inherently limiting speed of response and increasing transient power dissipation.

It is a primary object of the present invention to design a two-phase logic circuit having many of the advantages of four-phase logic with none of its drawbacks.

More particularly, it is an object of the present invention to design a synchronous two-phase semiconductor logic circuit having a combination of high speed, low power requirements, and reduced cost and semiconductor chip space, heretofore unattainable.

It is a further object of the present invention to provide a semiconductor shift register circuit which is effective to provide rapid and reliable shifting of data signals under the control of two-phase clock signals which effectively eliminates D.C. power dissipation without the need for additional isolation devices.

It is yet another object of the present invention to provide a two-phase MOS shift register using only four MOS devices per bit in which all devices may be uniformly dimensioned as small as the manufacturing process permits.

It is still another object of the present invention to design an MOS shift register which may be integrated on a semiconductor chip in a smaller space than prior comparable circuits.

It is yet another object of the present invention to provide a new and improved synchronous MOS shift register in which only one MOS device is required for each data node, data being shifted through four data nodes per bit under the control of two-phase logic.

It is another object of the present invention to design an integrated MOS logic circuit which utilizes the normally undesirable parasitic transistor action between adjacent MOS devices as an active part of the circuit operation.

The above objects are achieved in accordance with the present invention by the provision of a unique MOS circuit design wherein the output circuits of a pair of MOSFETs are operatively coupled by the inherent transistor action between their adjacent diffused regions, the effective transistor formed by such regions providing an operative conditional discharge path through the grounded substrate.

The above design is specifically described herein as embodied in a two-phase shift register the stages of which are alternately controlled by first and second nonoverlapping clock signals. Each stage comprises an input node, an intermediate node and an output node and first and second MOS devices, those stages being cascaded in series with the output node of one stage operatively connected to the input of the next stage. The first MOS device has its output circuit operatively connected between the operative clock signal source and the intermediate node while the second MOS device has its output circuit operatively connected between the operative clock signal source and the output node of that stage. The first MOS device has its control terminal returned to the clock signal source while the second MOS device is controlled at its gate terminal by the signal level at the intermediate data storage node. As a result, during the operative clock interval both the intermediate and output nodes are unconditionally charged to a first logic level.

The intermediate node is defined by the diffused region forming one output terminal of the first MOS device and that diffused region is disposed adjacent a second diffused region defining the input node of that stage. Accordingly, if the potential of one of these diffused regions is brought below (more positive than) the ground potential of the opposite conductivity substrate, bipolar transistor action will result from the inherent bipolar transistor defined by those two spaced diffused regions.

That bipolar transistor action is conditionally initiated by capacitively coupling the input node to the operative clock signal source. As a result if the input node is initially at the second logic level (i.e., ground) during the operative clock signal controlling that stage, the intermediate and output nodes are unconditionally charged to the first logic level (negative) through the first and second MOS devices, respectively. However, upon termination of the operative clock signal, the positive going edge thereof is capacitively coupled to the input node thereby to bias that node to a potential more positive than the grounded substrate. As a result, transistor action is initiated and the intermediate node is discharged to ground through the substrate. This in turn is effective to render the second MOS device nonconductive, thereby to clamp the output node at the second logic level to which it was charged during the operative clock signal.

Conversely, if the input node is initially at the first logic level (negative) the positive going edge at the termination of the operative clock signal is effective merely to return that node to a level slightly more positive than its initial negative level before the initiation of the clock signal. Accordingly, there is no parasitic transistor action between the input and intermediate nodes and the intermediate node remains charged negative, that node now being isolated from the positive going operative clock signal by the nonconductive first MOS device. The second MOS device remains conductive (as a result of the negative signal at its control terminal) thereby to discharge the output node through the positive going operative clock signal. As a result, the data at the input node has been shifted to the output node during one clock signal without any quiescent power dissipation.

The signal level at the output of one stage determines the initial condition of the input node of the next stage wherein the process is repeated during the second operative clock signal, the data being shifted from stage to stage under the control of the alternative nonoverlapping clock signals.

By utilizing the inherent parasitic transisor action in adjacent diffused regions as an active part of the shift register circuit, only two MOS devices per stage (four MOS devices per bit) of the register are required. Moreover, all MOS devices may be fabricated of uniformly minimum dimensions thereby to achieve maximum switching speed with a minimum of clock power required. In addition, all transient charging and discharging is effected through a single low resistance device thereby to additionally enhance maximum speed at minimum power. Finally, since the normally undesirable parasitic transistor action is actively utilized in the circuit, the diffused regions of the selected MOS devices may be disposed closely adjacent one another by the minimum distance required by the manufacturing process, thereby to substantially increase circuit density and provide for the integration of more functions on the chip.

To the accomplishment of the above and to such other objects as may hereinafter appear, the present invention relates to an MOS logic circuit as defined in the appended claims and as described herein together with the accompanying drawings, in which:

Figure 1:
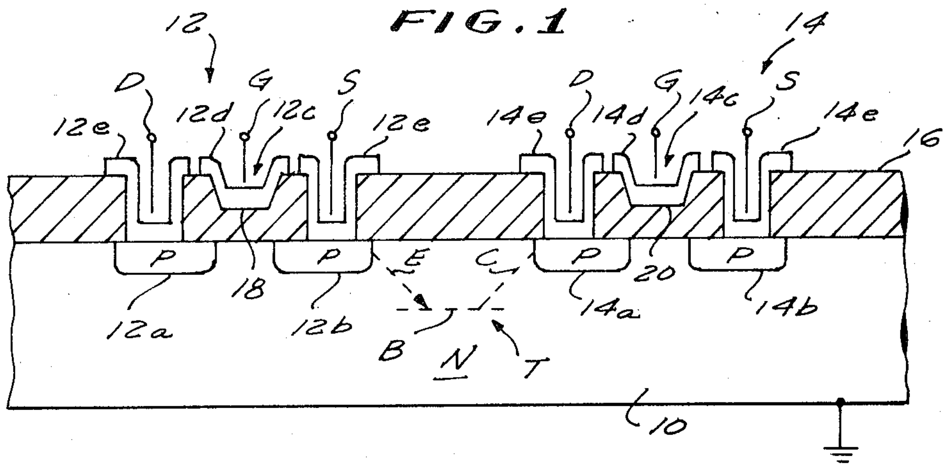
FIG. 1 is a schematic cross-sectional view of a semiconductor substrate having diffused regions forming a pair of adjacent MOS field effect transistors and illustrating the effective bipolar transistor formed therebetween.

Referring now specifically to FIG. 1, there is illustrated a simplified schematic cross sectional view of a semiconductor substrate 10 upon which a pair of MOS field effect transistors 12 and 14, respectively, are formed. As there shown, each MOSFET comprises a pair of diffused regions 12*a* and *b* and 14*a* and *b*, respectively, of opposite conductivity type from the semiconductor material forming the substrate 10. In the embodiment here specifically illustrated, the substrate is N type semiconductor material, the diffused regions being of P type material thereby forming P channel MOSFETs. It will be apparent, however, that the present invention is equally applicable to an N channel MOSFET comprising N type diffused regions in a P type substrate.

Disposed atop substrate 10 is a relatively thick layer of insulating material 16 typically of silicon dioxide although other insulating materials including other oxides and nitrides are suitable. A typical MOS integrated circuit is formed by making a large number of such diffusions of appropriate impurities into the semiconductor substrate through suitable window openings in the insulating layer 16, that layer being subsequently thinned at selected locations by an appropriate etching technique to form the gate area between the two closely spaced diffused regions of an active MOSFET. As illustrated in FIG. 1, the insulating layer 16 is thinned at 18 and 20 to form the gate areas 12*c* and 14*c*, respectively of active MOS devices 12 and 14. The gate electrodes 12*d* and 14*d* are deposited on the recessed gate areas 12*c* and 14*c*, respectively, of MOSFETs 12 and 14 and the output electrodes (termed the source and the drain) 12*e* and 12*f* and 14*e* and 14*f*, respectively, are deposited directly atop the diffused regions 12*a* and 12*b* and 14*a* and 14*b* respectively.

A plurality of such devices are typically operatively connected in appropriate circuit configuration by suitable metalization runs atop the insulating layer 10, those connections being indicated schematically by the terminals G, S and D (standing for gate, source and drain). In operation, the drain is typically selectively connected to a negative potential and the gate, which serves as the control electrode, is connected to the signal voltage. If the gate is at zero potential with respect to the source, no current flows from source to drain because the PN junctions are reverse biased. However as the gate is made more negative with respect to the source, free electrons that are present in the N type material are repelled, forming a depletion region. Once sufficient depletion has occurred, additional gate bias induces positively charged holes to the surface thereby to form a channel area. When enough holes are accumulated in the channel to overcompensate for the N type doping of the substrate, the surface of the channel changes from N type to P type and ohmic conduction occurs between the output source and drain terminals. Accordingly, the signal on the gate is effective to modulate the number of carriers within the channel region and thereby controls the current flow through the channel. In a typical MOS logic circuit of the type here described, the relative location of the closely spaced P regions defining active MOSFETs is determined by the physical layout of the circuit on the semiconductor chip. Layout considerations frequently dictate that the diffused regions such as P regions 12*b* and 14*a* of two MOS devices such as 12 and 14 be located adjacent one another. These adjacent P regions are separated by the semiconductor N type material of substrate 10 so that an equivalent PNP transistor is thereby formed. For example, as illustrated schematically in broken lines in FIG. 1, P region 12*b* defines the emitter E and P region 14*a* defining the collector C of a transistor T, the base B of which is defined by the substrate 10. As illustrated, the substrate 10 is normally grounded. Thus as the source terminal S of device 12 is drawn toward a positive level, a positive potential is transferred to the P region 12*b* which in turn induces a flow of positive carriers (holes) from that P region through the N type substrate 10 to the adjacent P region 14*a* of MOS device 14. If that P region is charged negative, the foregoing transistor action is effected to provide a discharge path through the substrate to P region 12*b*. This "parasitic transistor action" is normally undesirable and must be avoided by sufficient spacing of adjacent P regions and/or the use of blocking P regions to block the flow of carriers. The present invention, however, provides a circuit design which actually utilizes the above described transistor action as an active functioning part of the circuit.

Figure 2:
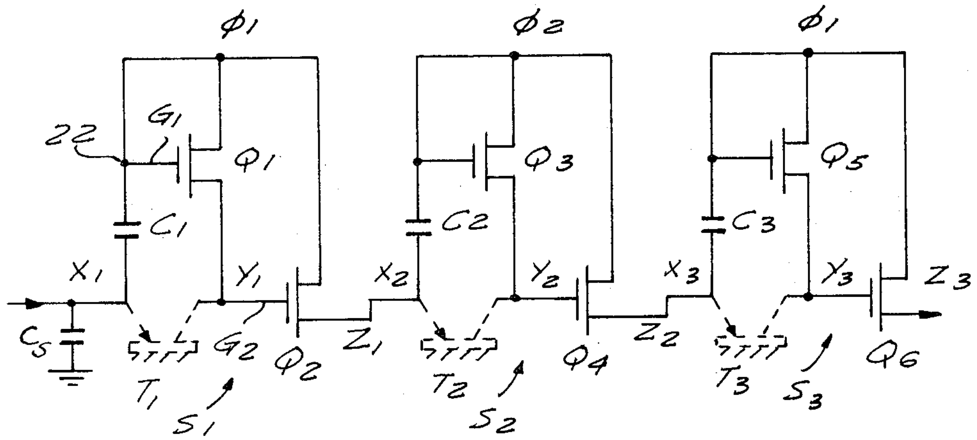
FIG. 2 is a circuit diagram of three stages of a shift register designed in accordance with the present invention.

As herein specifically described and illustrated in FIG. 2, this unique circuit operation is embodied in a two-phase shift register adapted to shift data from stage to stage under the influence of a pair of nonoverlapping clock signals $\phi 1$ and $\phi 2$. Three stages of the register are illustrated in FIG. 2, it being understood that as many stages as are needed or desirable may be provided.

Referring specifically to the first stage S1 of the register, it comprises a data input port $X_1$, an intermediate data storage node $Y_1$ and a data output port $Z_1$. A first MOSFET Q1 has its output circuit operatively connected between $\phi 1$ clock signal and the intermediate data storage node $Y_1$, its gate terminal $G_1$ being returned to its drain via node 22. A second MOSFET Q2 has its output circuit operatively connected between the $\phi 1$ clock signal and the output port Z1, its control terminal G2 being operatively connected to the intermediate data storage node Y1. A coupling capacitor C1 is operatively connected between node 22 and the input port X1 and is effective to capacitively couple the leading and trailing edges of the $\phi 1$ clock signal to input port X1. Storage capacitor Cs typically represents the inherent circuit node capacitance at input port X1 or alternatively may be a discrete storage capacitor.

Output port Z1 of stage S1 is operatively connected to the input port X2 of the next stage S2 of the register. That stage $S_2$ is identical to the first stage S1, FETs Q3 and Q4 in stage S2 corresponding to FETs Q1 and Q2 in stage S1, with the exception that stage S2 is controlled by the $\phi 2$ clock signal. Similarly, stage S3 is identical to the previous stages S1 and S3, FETs Q5 and Q6 corresponding respectively to FETs Q1 and Q2 in stage S1 and FETs Q3 and Q4 in stage S2, stage S3 being controlled by the $\phi 1$ clock signal. While only three stages are herein illustrated, it will be appreciated that the register may continue on with identical stages for as long as required (a typical register may include hundreds of stages), alternate stages being clocked by the $\phi 1$ and $\phi 2$ clock signals respectively.

Figure 3:
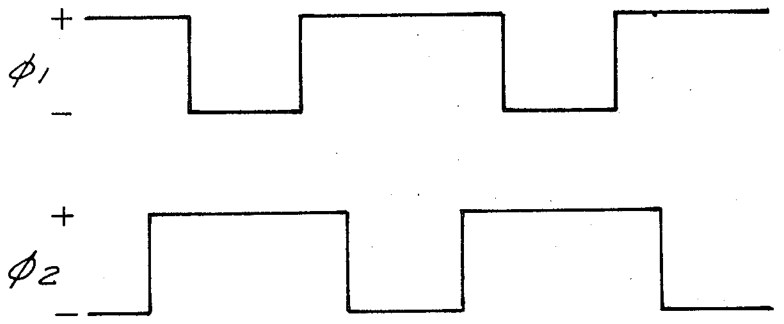
FIG. 3 is a timing diagram graphically illustrating the phase relationship of the two clock signals utilized to control the shift register of FIG. 2.

Those clock signals are illustrated graphically in FIG. 3 and as there shown are typically nonoverlapping pulses having an identical waveform which extends between a logic "0" or positive (+) signal and a logic "1" or negative (−) level. The interval during which a given clock signal is at an effective logic "1" level (−) is typically referred to as the "time" of that clock phase. Thus, as hereinafter used, the term "$\phi 1$ time" refers to the time during which the $\phi 1$ signal is negative and "$\phi 2$ time" refers to the time during which the $\phi 2$ signal is negative. Typically, as illustrated, there is a small interval between clock phases (i.e., between the termination of $\phi 1$ time and the onset of $\phi 2$ time).

Referring again to FIG. 2, it will be appreciated that all of the operative data storage nodes X, Y and Z are defined by diffused regions. For example, if the substrate is N type semiconductor material and all MOSFETs are P channel enhancement mode devices, then, for example, in the typical intermediate stages S2, node X2 (or Z1) is defined by the P region forming the source of FET Q2, node Y2 is defined by the P region forming the source of FET Q3 and node Z2 (or X3) is defined by the P region forming the source of FET Q4, and so on for the remaining stages of the register.

The input port X1 of the first stage of the register and the output port (here Z3) of the last stage of the register will typically be defined by the diffused P regions associated with other circuitry or they may be formed of specially diffused P regions.

The P regions X (or Z) and Y are diffused in the semiconductor substrate in closely adjacent locations thereby to form effective PNP transistors having their emitters at nodes X and their collectors at nodes Y. This may be visualized by reference to FIG. 1 in which FETs 12 and 14 may be considered to represent FETs Q2 and Q3 or Q4 and Q5, respectively.

Thus an effective PNP transistor T1 is formed between input port X1 and node Y1, an effective PNP transistor T2 is formed between input port X2 and node Y2 and an effective PNP transistor T3 is formed between input port X3 and node Y3.

The circuit operates as follows: Assume that the data input signal at input port X1 is negative. During $\phi 1$ time intermediate node Y1 is unconditionally charged negative by clocked switching FET Q1 and output port Z1 is accordingly rendered conductive, unconditionally charging output port Z1 negative. Simultaneously, the negative going edge of clock pulse $\phi 1$ is capacitively coupled to the input port X1 through coupling capacitor C1 thereby to increase the negative level of the input data. At the termination of $\phi 1$ time the positive going edge of the $\phi 1$ clock pulse is effective to return the input port X1 to its negative level before the onset of $\phi 1$ time. In addition, switching FET Q1 is rendered nonconductive thereby to isolate node Y1, node Y1 remaining at its negative level thereby to maintain FET Q2 conductive, discharging the output port Z1.

During $\phi 2$ time intermediate node Y2 is unconditionally charged negative through clocked switching FET Q3 thereby turning on FET Q4 to unconditionally charge output port Z2 to the negative level. Output port Z1 of stage S1 (or input port X2 of stage S2) remains clamped to the $\phi 1$ clock signal source through FET Q2 at the positive level. As a result when $\phi 2$ goes positive at the end of $\phi 2$ time, input port X2 is pushed more positive than the substrate potential by the capacitive coupling of the positive going edge of $\phi 2$ via coupling capacitor C2. Accordingly, that positive going edge is effective to initiate transistor action through the PNP transistor T2, that transistor being rendered conductive thereby to discharge the previously charged intermediate node Y2. The positive going signal at node Y2 is in turn effective to turn off FET Q4 thereby to isolate output port Z2 from the $\phi 2$ clock and to maintain it at its previously charged negative level. As a result of the foregoing, the negative input data at input port X1 has been shifted during one complete clock cycle to the output port Z2 of stage S2 or by one bit of the register.

Conversely, if on the other hand the data input signal at data input port X1 is initially positive or at substrate potential the following takes place. During $\phi 1$ time intermediate node Y1 and output port Z1 are unconditionally charged negative as previously described. However, at the termination of $\phi 1$ time the positive going edge of the $\phi 1$ clock signal is capacitively coupled through coupling capacitor C1 to input port X1 thereby pushing the input data signal level more positive than substrate thereby to initiate conduction through PNP transistor T1. As a result intermediate node Y1 is discharged to a positive level thereby turning off FET Q2 to isolate output port Z1 from the $\phi 1$ clock signal and to maintain it at its previously charged negative level. During $\phi 2$ time intermediate node Y2 and output port Z2 of stage S2 are again unconditionally charged negative, input port X2 being pushed more negative by the capacitive coupling effect of coupling capacitor C2. At the termination of $\phi 2$ time the positive going edge of the $\phi 2$ clock signal is effective to return input port X2 to its original negative level before the onset of $\phi 2$ time and intermediate node Y2, being isolated from the $\phi 2$ clock signal, remains negatively charged thereby to maintain FET Q4 conductive discharging output port Z2 to ground or substrate potential. Thus the zero or ground potential level at input port X1 has been shifted to the output port Z2 of stage S2 during one complete clock cycle.

It will be appreciated from the foregoing that the unique circuit design herein shown and described is effective to provide rapid and reliable shifting of data signals at one of two operative logic levels by one bit of the register under the control of a two-phase clock cycle. Moreover, this is accomplished through the use of only four MOS devices per bit of the register, those devices all being of a uniform minimum size effective to provide high speed, low power switching. In addition, substantially all quiescent power dissipation is eliminated by means of the ingenious use of the effective bipolar transistor action created by adjacent diffused regions in two MOS devices. That transistor action, since it is actively utilized in the circuit, may be enhanced by locating the adjacent diffused regions of the two MOSFETs in closely adjacent relationship thereby to substantially increase the density of the circuit on the chip. It will be appreciated that while the unique circuit technique has been herein illustrated and described with specific reference to an MOS shift register, various other applications of this technique and circuit arrangements therefore will be apparent to those skilled in the art.

While only a single embodiment of the invention has been herein specifically described, it will be apparent that many variations may be made therein, all within the scope of the invention, as defined in the following claims.

I claim:

1. A semiconductor circuit integrated on a semiconductor substrate of a first conductivity type and comprising a plurality of field effect devices each having output terminals defined by a pair of diffused regions of a second conductivity type the adjacent diffused regions of two separate field effect devices defining with said substrate an effective bipolar transistor, means biasing said substrate to a reference potential, and means connected to one of said adjacent diffused regions, independently of the field effect device partially defined by said one of said adjacent diffused regions and effective to periodically change the potential at said one of said adjacent diffused regions to render said effective bipolar transistor conductive, thereby to conductively connect said one of said adjacent diffused regions to draw said other of said adjacent diffused regions toward said reference potential.

2. The circuit of claim 1 further comprising a source of timed clock signals, said semiconductor circuit being synchronously controlled by said timed clock signals, and wherein said potential changing means comprises means capacitively coupling said one of said adjacent diffused regions to said source.

3. The circuit of claim 1, wherein said semiconductor circuit is a logic circuit adapted to operate upon data signals at first and second logic levels, and wherein one or more of the output terminals of said field effect devices define data storage nodes for storing said data signals, first switch means for unconditionally charging said one of said adjacent diffused regions to said first logic level during a first time interval and for conditionally discharging said one of said adjacent diffused regions to said second logic level at the end of said first time interval, second switch means for unconditionally charging said other of said adjacent diffused regions to said first logic level during a second subsequent time interval, said effective bipolar transistor being adapted to conditionally discharge said other of said adjacent diffused regions to said second logic level at the end of said second time interval depending upon the logic level of said one of said adjacent diffused regions.

4. The circuit of claim 3 further comprising a source of timed clock signals, said semiconductor circuit being synchronously controlled by said timed clock signals, and wherein said potential changing means comprises means capacitively coupling said one of said adjacent diffused regions to said source.

5. The circuit of claim 3, wherein said logic circuit is a shift register and wherein said first and second time intervals are defined by first and second clock signals, respectively, said first switch means comprising a first field effect device, one of whose output terminals is defined by said one of said adjacent diffused regions and said second switch means comprising a second field effect device, one of whose output terminals is defined by said other of said adjacent diffused region.

6. The circuit of claim 5, wherein said register comprises a plurality of stages each of which comprises both said first and said second field effect devices, and wherein said one of said adjacent diffused regions defines a first output terminal of said first field effect device in one stage of the register, the second output terminal of said first field effect device being connected to said source to receive said first clock signal, said other of said adjacent diffused regions forming a first output terminal of said second field effect device of the next stage of the register, the second output terminal of said second field effect device being connected to said source to receive said second clock signal, the control terminal of said first field effect device of said one stage being connected to the first output terminal of said second field effect device of said one stage and the control terminal of said second field effect device of said next stage being connected to said source to receive said second clock signal.

7. The shift register of claim 6, wherein said potential changing means comprises means capacitively coupling the first output terminal of said first field effect device of said one stage to said source to receive said second clock signal.

8. The circuit of claim 3, wherein said first and second switching means comprises first and second field effect devices, respectively and wherein said first and second intervals are defined by first and second nonoverlapping clock signals generated by a clock signal source, respectively, the adjacent diffused regions of said first and second field effect devices defining said effective bipolar transistor, and means connecting the nonadjacent diffused regions of each of said first and second field effect devices to said source to receive said first and second clock signals, respectively.

9. The circuit of claim 8, wherein said potential changing means comprises means capacitively coupling said one of said adjacent diffused regions to said source to receive said second clock signal.

10. A semiconductor logic circuit comprising a data input port, a data output port, an intermediate data node, first, second and third switching devices, a reference potential, and a source of a timed clock signal, said first switching device being connected to said input port, said intermediate node, and said reference potential and being controlled by the signal level at said input port, the output circuit of said second switching device being connected between said intermediate node and said clock signal source and being controlled by said clock signal and the output circuit of said third switching device being connected between said output port and said clock signal source and being controlled by the signal level at said intermediate node, and means connecting said input port to said clock signal source to conditionally bias said first switching device into conduction at the termination of said clock signal.

11. The circuit of claim 10, wherein said first switching device is a bipolar transistor having its emitter connected to said input port, its collector connected to said intermediate node and its base connected to said reference potential, said second and third switching devices being field effect devices, said second switching device having its output circuit connected between said clock signal source and said intermediate node and said third switching device having its output circuit connected between said clock signal source and said output port.

12. The circuit of claim 11, wherein said field effect devices are integrated on a substrate of semiconductor material of a first conductivity type, said bipolar transistor being defined by said semiconductor substrate and the adjacent diffused regions of an opposite conductivity type each of which defines an output terminal of one of said first and second field effect devices respectively, said substrate defining the base of said bipolar transistor and being at said reference potential.

13. The circuit of claim 12, wherein the control terminal of said second switching device is connected to said clock signal source and said control terminal of said third switching device is connected to said intermediate node, said means connecting said input port to said clock signal source comprising a capacitor connected between the control terminal of said second switching device and said input port.

14. The structure of claim 13, wherein said circuit is a stage of a shift register, said collector of said bipolar transistor being defined by the diffused region constituting an output terminal of said second switching device, the emitter of said bipolar transistor being defined by the diffused region constituting an output terminal of the third switching device of the previous stage of said register, the output circuits of said second and third switching devices of successive stages of said register being connected to sources of first and second nonoverlapping clock signals, respectively.

* * * * *